US006925354B2

(12) United States Patent  (10) Patent No.: US 6,925,354 B2
Mörwald et al.  (45) Date of Patent: Aug. 2, 2005

(54) PROCESS FOR THE CONTROL OF AN INJECTION-MOULDING MACHINE

(75) Inventors: Rupert Mörwald, Schwertberg (AT); Engelbert Kastner, Perg (AT); Walter Eglseer, Behamberg (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 341 days.

(21) Appl. No.: 10/268,126

(22) Filed: Oct. 10, 2002

(65) Prior Publication Data

US 2003/0075818 A1 Apr. 24, 2003

(30) Foreign Application Priority Data

Oct. 18, 2001 (AT) ...................................... GM809/2001

(51) Int. Cl.⁷ .............................................. B29C 45/00
(52) U.S. Cl. .................... 700/200; 700/201; 264/297.2; 264/297.3; 264/328.1; 425/151; 425/153; 156/125
(58) Field of Search ................................ 700/200, 201; 264/40.1, 40.3, 297.2, 297.3, 328.1; 425/151, 153, 154, 162; 156/125

(56) References Cited

U.S. PATENT DOCUMENTS 5,326,246 A 7/1994 Usui et al.
5,493,503 A * 2/1996 Richards et al. ............ 700/200
6,073,059 A 6/2000 Hayashi et al.

FOREIGN PATENT DOCUMENTS

| DE | 91 10 348 U1 | 12/1992 |
| EP | 0573912 | 6/1993 |
| JP | 02103114 A | 4/1990 |
| JP | 2001315179 A | 11/2001 |
| WO | 0167191 | 9/2001 |

* cited by examiner

Primary Examiner—Leo Picard
Assistant Examiner—Charles Kasenge
(74) Attorney, Agent, or Firm—Notaro & Michalos P.C.

(57) ABSTRACT

Process for the control of an injection-moulding machine and optionally at least one handling apparatus allocated to same in which, in a form guiding the operator, the operating parameters required for an injection cycle to run are entered via an input unit into a data processing unit storing these operating parameters and then one or more injection cycles are carried out according to the stored operating parameters, safety conditions for the protection of machine parts by means of which certain movement sequences of the injection-molding machine or the handling device are forbidden or allowed, being specified prior to the start of injection, there being provided on a screen an input mask on which one of several, preferably graphically displayed, basic movement modules is selected in each case and on which then, for every selected basic movement module, a safety condition in the form of logical, preferably Boolean operations is adjusted or adopted from the state of one or more different basic movement modules and finally stored.

12 Claims, 4 Drawing Sheets

PROCESS FOR THE CONTROL OF AN INJECTION-MOULDING MACHINE

The invention relates to a process for the control of an injection-moulding machine and optionally of at least one handling device allocated to same, in which, in a form guiding the operator, the operating parameters required for an injection cycle to run are entered via an input unit into a data processing unit storing these operating parameters and then one or more injection cycles are carried out according to the stored operating parameters, safety conditions for the protection of machine parts by means of which certain movement sequences of the injection-moulding machine or the handling device are forbidden or allowed, being specified prior to the start of injection.

Furthermore the invention relates to an apparatus for controlling an injection-moulding machine and optionally at least one handling device allocated to same, in particular for carrying out the above-mentioned process.

Processes for the control of injection-moulding machines and optionally handling devices with the aid of stored-program controls and user-friendly operating interfaces which support the user during programming and operating, are already known. For example, EP 0 573 912 D1 shows such a process for controlling a plastics injection-moulding machine. To protect the expensive tools (injection moulds) from damage, it is already known to specify, before injection begins, safety conditions in which certain movement sequences take place or are explicitly allowed. For example, it is not to be possible to close the injection mould when the ejector is extended. With known systems according to EP 0 573 912, such safety conditions are unadjustably pre-programmed ex works, i.e. by the injection-moulding machine manufacturer. The user can freely programme the movement sequence of his injection-moulding machine. The pre-programmed stored safety conditions ensure that no movement sequences take place which will possibly lead to damage to components, in particular the expensive tools (injection moulds).

The object of the invention is to provide a process which is improved, in particular in respect of flexibility, and corresponding apparatuses for the control of an injection-moulding machine and optionally at least one handling device allocated to same.

The process according to the invention is characterized by the provision on a screen of an input mask on which one of several, preferably graphically displayed, basic movement modules is selected in each case and on which then, for every selected basic movement module, a safety condition in the form of logical, preferably Boolean operations is adjusted or adopted from the state of one or more different basic movement modules and finally stored.

A first variant of the apparatus according to the invention is characterized by a reading apparatus for a data carrier authorizing the modification of at least part of the safety conditions and/or by an input apparatus for inputting a code authorizing the modification of at least part of the safety conditions.

A further variant of the apparatus according to the invention is characterized by a reading apparatus for a transportable data carrier programmed with safety conditions—preferably allocated to a specific injection mould.

Finally a further variant is characterized by an interface and/or a communication module—preferably including a modem—for transferring safety conditions prepared offline and stored on an external intermediate memory to a memory of the console of the injection-moulding machine or a handling device of same.

In contrast to the state of the art, according to the invention the user is given the possibility of modifying or completely recreating the safety conditions (optionally to a limited extent and at various authorization levels). Via an input mask displayed on the screen with graphically displayed basic movement modules, for example the basic movement module "Close mould" a safety condition [can be] specified for each of these basic movement modules. This takes place in the form of logical Boolean operations of states of one or more different basic movement modules, for example the safety condition can be formulated that the basic movement module "Close mould" is only allowed if the state of a different basic movement module, i.e. that of the ejector is "Ejector not extended". The safety conditions which can thus be easily created by means of graphic symbols can then be stored and subsequently taken into account during programming or when operating the injection-moulding machine.

It is favourable if the safety conditions are specified by the user after the components of the injection-moulding machine or the handling device required for the respective production sequence, and thus the possible basic movement modules, have been selected by the user, because then not all conceivable components of the injection-moulding machine need be taken into account, but only those which are used in the actual project. This allows a simplified definition of safety conditions.

On the other hand it is favourable if the safety conditions are specified by the user before the actual graphically supported programming of the injection-moulding cycle begins on the screen, program steps which infringe safety conditions not being offered to the user from the outset, not being allowed in a selection or at least being identified as such. The advantage of this is that steps which infringe safety conditions are noticed immediately during programming, or are not allowed from the outset. The problem does not then arise that only after a complete sequence program is completed is it discovered that a safety condition is being infringed somewhere. Rather, the safety conditions can be checked step by step.

The process according to the invention can be carried out directly on the console of the injection-moulding machine, which customarily has a screen. However it is also possible to create the specification of the safety conditions, which is part of programming in the broadest sense, from a screen connected online to a network, and finally store this in the memory of the console.

Particularly favourable is a variant of the process in which the safety conditions are at least partly created offline on a screen of a computer separate from the console of the injection-moulding machine or the handling device, firstly stored on an intermediate memory and later transferred by the user into a memory of the console. This allows a part of the safety conditions, for example those connected with a specific tool (injection mould), to be specified not by the user of the injection-moulding machine, nor by the injection-moulding machine manufacturer, but by the manufacturer of the tool. The latter knows the safety problems of the tool best and can therefore undertake a reliable specification of the safety conditions. The thus-defined safety conditions, for example regarding the tool, can then be transferred into the console in many different ways, for example by means of transportable non-volatile data carriers such as diskettes, CD-ROMs or EEPROMs. It is however also possible to transport the safety conditions created offline via a network, for example the Internet, and to import them into the console.

The apparatuses according to the invention, in particular for carrying out the above-mentioned process, accordingly preferably have a reading apparatus for such transportable data carriers with the safety conditions, or a modem or similar for reading in the safety conditions via a data network. Finally it is also possible for the transportable data carrier to consist of a microchip which is connected to the injection mould, a reading apparatus on the console reading this microchip and thus adopting the safety conditions.

If the user himself can modify the safety conditions, it is advantageous to specify a hierarchy showing which user may modify which safety conditions. For example it can be specified that any user may choose or modify simple safety conditions, whereas complex safety conditions with a high risk of damage may only be modified by specially authorized persons. The persons can be identified for example by a data carrier allocated to them or a special code which they must input during operation.

Overall it is favourable for safety reasons if the specification of the safety conditions starts from default safety conditions restrictively preformulated in the works. The user can then delete certain branches from these very strict default safety conditions and ease the safety conditions. Each of these steps is to be carried out deliberately, so that the danger of forgetting a safety condition is reduced. The user naturally still retains a degree of responsibility. However, the flexibility of the system is significantly higher than with the state of the art. Further advantages of the details of the invention will be explained in more detail using the following description of the figures:

Figure 1:
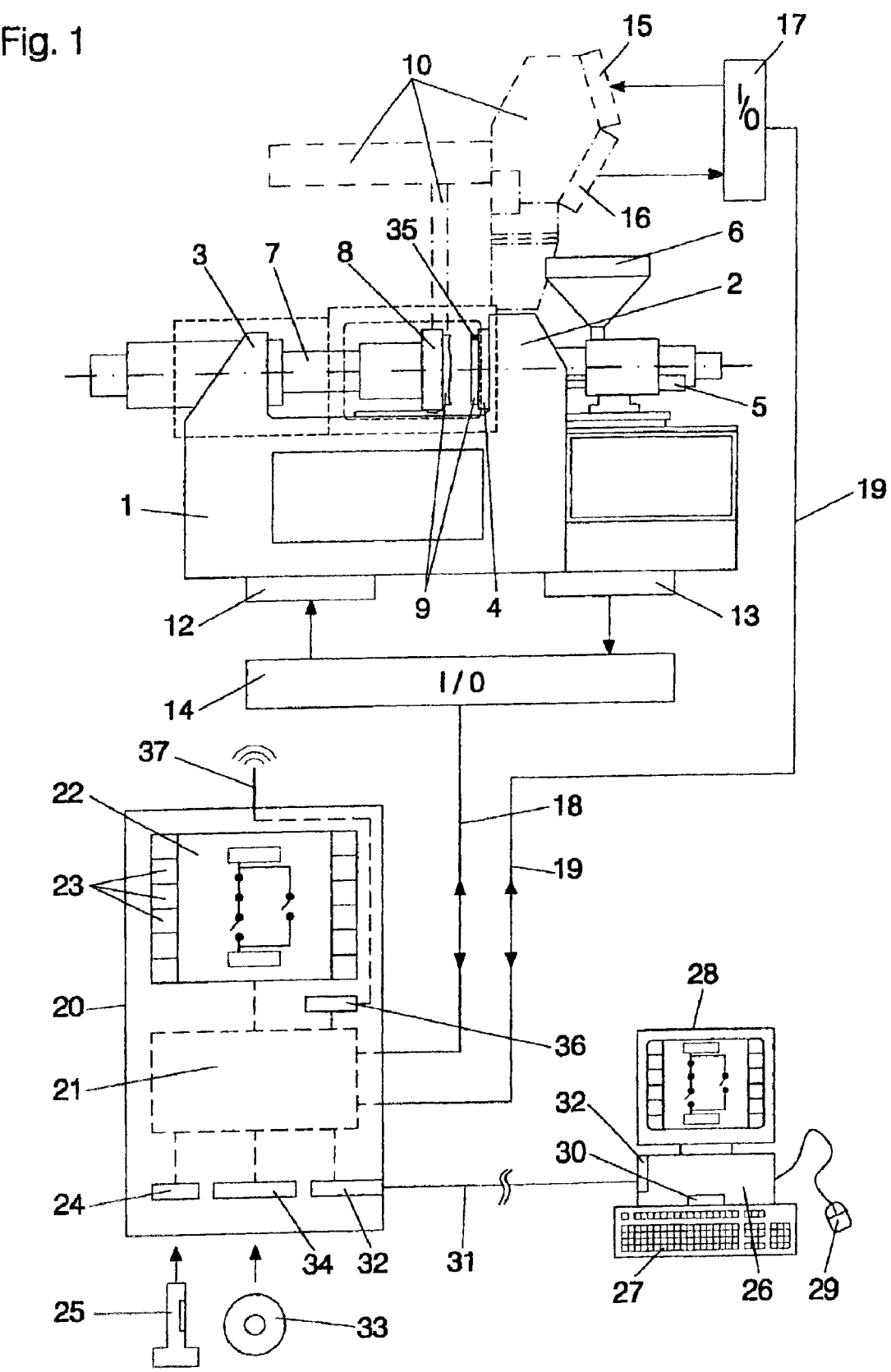
FIG. 1 shows an apparatus according to the invention for the control of an injection-moulding machine and a handling device (multiaxial linear robot) allocated to same in a schematic representation by way of example.

The actual injection-moulding machine shown in FIG. 1 is itself constructed according to the state of the art: it has an essentially U- or C-shaped frame 1 with two arms 2 and 3. A stationary platen 4 which bears one of two mould halves 9 is attached to the right-hand arm 2 in FIG. 1. The other mould half 9 is attached to the moving platen 8 which can be moved back and forth in horizontal direction via a hydraulic piston cylinder unit. The hydraulic piston cylinder apparatus 7 rests on the left-hand arm 3. FIG. 1 shows the mould in partly opened position. To close the mould, the platen 8 is moved to the right until the two mould halves 9 are closed. Plastics material which has preferably been fed in in granular form via the hopper 6 is then injected into the closed mould in plasticized, i.e. at least viscous form, via the injector unit 5 which has a screw extruder for example. After a cooling phase, the mould is opened and the plastics article can be removed via the handling device (here for example a biaxial linear robot 10). To this end, the latter has a gripper, not shown in more detail, on the arm pointing vertically downwards. All the above mechanical or hydraulic orelectric components need not be described in more detail as they are already known to a person skilled in the art in the field of injection moulding.

Several preferably electrically operable actuators 12 are provided on the injection-moulding machine. These actuators 12, represented very schematically, are naturally arranged inside the injection-moulding machine in reality and consist for example of switches, electrically operable solenoid valves for the hydraulics or similar. The components of the injection-moulding machine can essentially be moved in a controlled way via same.

To learn the actual state of the current movement sequence, numerous sensors are collectively numbered 13. The sensor data and the control commands for the actuators 12 can be made to communicate with a bus system 18 via an input/output logic 14 which can also be distributed over several cards.

The handling device 10, for example a bi- or multiaxial linear robot with electric servomotor drive and electrically controlled grippers, is controlled via the field bus 19. The actuators are numbered 15 here, the sensors 16. It should be mentioned again that this representation is very schematic. Naturally the actuators and sensors are arranged distributed over the handling device. The input/output logic allows a communication with the console 20 which is described in more detail in the following.

The injection-moulding machine and the handling robot are controlled from a console 20 with a computer unit 21, via the field bus systems 18 and 19. The computer unit 21 is designed in the embodiment shown such that with a single processor it realizes both the stored-program control for the injection-moulding machine program and for the handling robot program. The computer unit 21 is also responsible for the display and data input via the touchscreen 22. In addition, a user-friendly dialog system for programming the injection-moulding machine can be implemented on this computer. By means of such a user-friendly dialog system it is initially possible to specify the components necessary for a specific task of the injection-moulding machine or the handling device and thus to select the possible basic movement modules by the user. An example would be the basic movement module "Close mould", another basic movement module "Injection" by means of the injector unit. By means of such basic movement modules preferably represented by graphic softkeys, the user can undertake a system-aided programming and then a parameterizing of the injection-moulding cycle.

To exclude movement states which possibly lead to damage to machine parts, safety conditions are provided which restrict certain movement sequences which are however possible in principle.

The specification of the safety conditions is carried out according to the invention by providing on a screen, for example the touchscreen 22, an input mask on which one of several preferably graphically represented basic movement modules is firstly selected in each case. The basic movement modules can be displayed for example in the fields 23 of the left-hand column of the screen, as can be seen in the enlarged representation according to FIG. 2.

Figure 2:
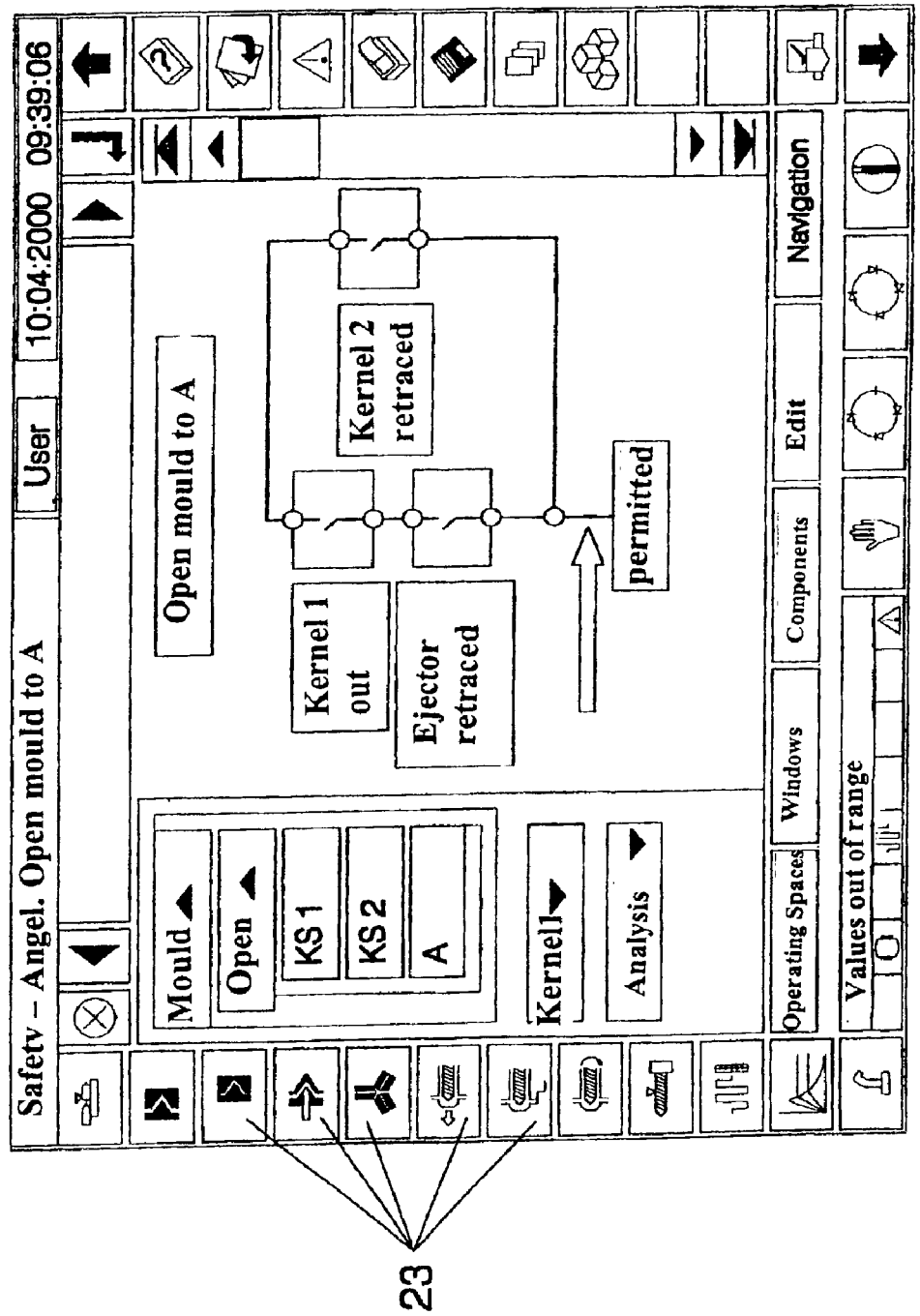
FIG. 2 shows a possible screen display when specifying the safety conditions for the injection-moulding machine.

After selection of a basic movement module for which a safety condition is to be specified, the safety condition can be formulated from a state of one or more different basic movement modules in the form of Boolean operations, a graphic support by means of animated "electric" switch symbols being favourable as is shown in FIG. 2 by way of example. The animated symbols show, for a satisfied condition, a closed electric circuit which can also be suitably identified by means of colour. Thus during diagnosis, it can also be immediately seen how the safety condition is being infringed. The advantage of this type of display is that it is the display method known above all to electricians and SPC programmers. Naturally there are also other possibilities of showing the Boolean operations. The graphic representation by means of different paths and switches is however very easy to monitor and thus well suited to the untrained user.

After setting the safety conditions, manual operation is possible, usually however the sequence programming of the injection-moulding machine takes place beforehand.

The setting and modification of the safety conditions is, as already mentioned, favourably arranged hierarchically. Important safety conditions are only possible through specially trained and authorized persons. This also includes the entering of safety conditions created offline, which will be examined in more detail later. The console can recognize the authorized person either through the input of a code or via a reading apparatus 24 which can for example read a special chipcard allocated to the authorized user, and thus establishes the authorization. For safety reasons, all modifications to the safety conditions are logged internally.

In principle, safety conditions can be formulated for each possible action of a basic movement module (e.g. "Ejector out"). Whether a safety condition must be formulated for a movement is defined in advance in a program step in which the selection of the components to be specified in the current injection-moulding machine is specified.

In principle the safety conditions can be created as logical Boolean operations, the safety conditions being able to be formulated in the form of a permission and/or in the form of a prohibition.

The finished safety conditions are then entered into a distinct safety program or stored.

The input favourably starts from default safety conditions which are formulated very restrictively, and then all unnecessary conditions deleted. Thus the conditions can be adapted very rapidly and with a high degree of certainty.

An error message which is issued upon non-fulfilment can be defined for every included Boolean state value entered. The default composition of the error message in the name of the action and the state which is not satisfied.

Furthermore provision can be made for the possibility of circumventing the safety conditions by means of a SIT button and corresponding user level in order to carry out manual operating movements during commissioning on the manufacturer's premises without all signals already being connected. Upon activation of this function, corresponding warning messages are to be issued.

Figure 3:
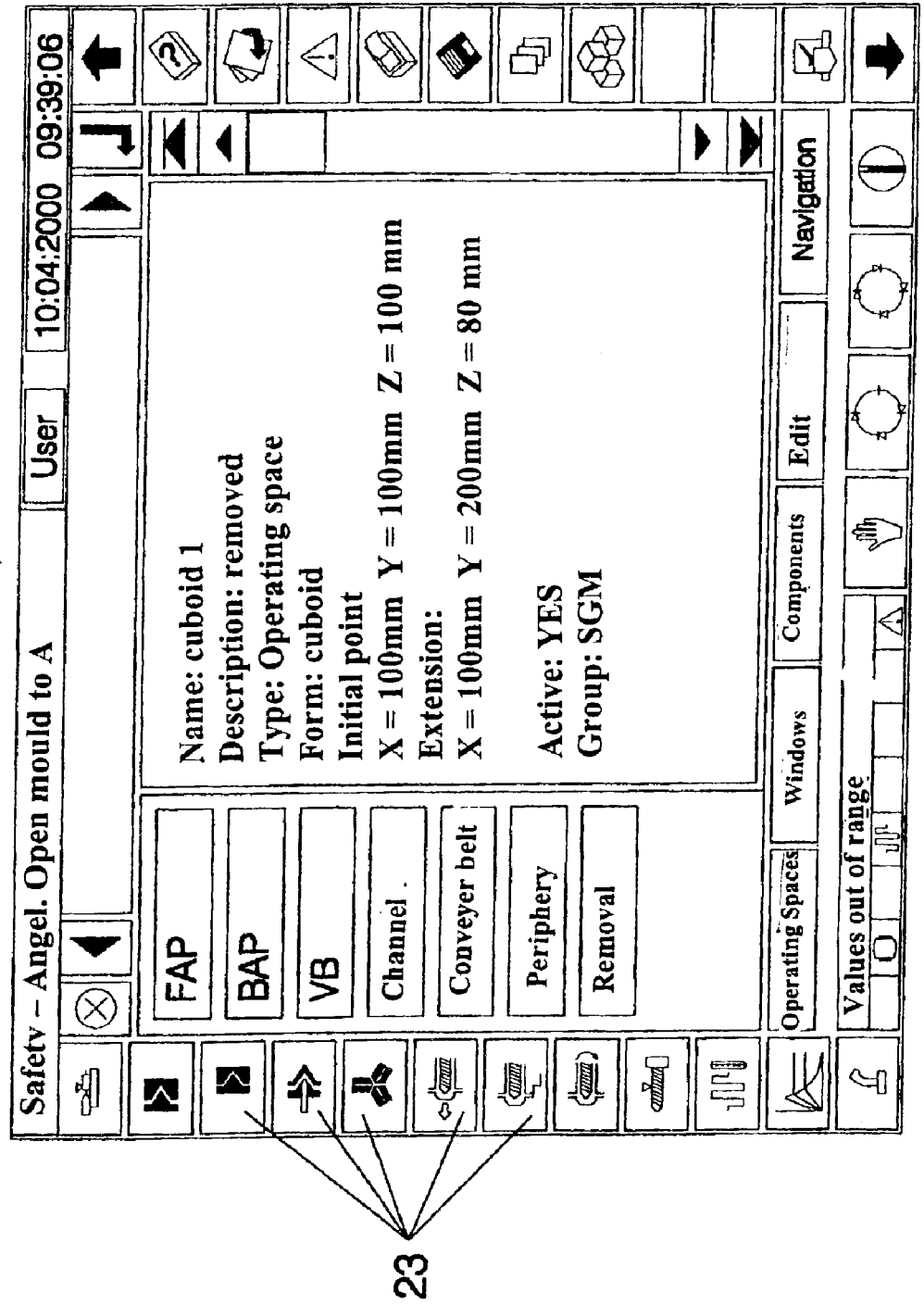
FIGS. 3 and 4 show possible screen displays when specifying safety conditions for the handling device (robot).
Figure 4:
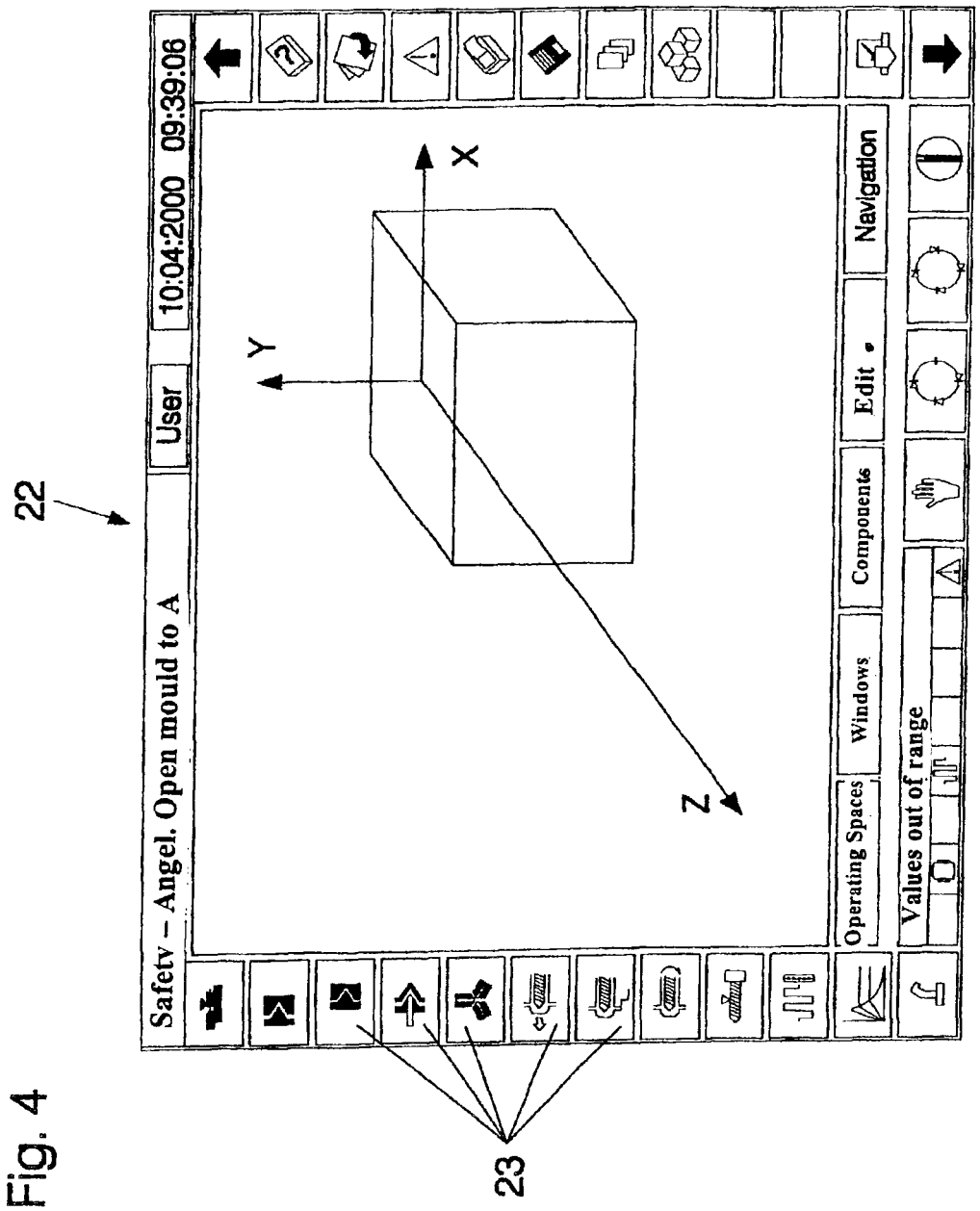

A particular form of safety conditions are the operating or blocking spaces of the handling device 10. If one has been defined, the operating spaces of same can be processed. The operating-space data are entered via system functions. All operating spaces can be displayed in a triaxial coordinates system as shown in FIG. 3 (numerically) and FIG. 4 (graphically). The view of this virtual space is to be modifiable, furthermore it is to be possible to superimpose or erase its operating/blocking spaces and to give them their own colours.

The same touchscreen 22 can be used to specify the safety conditions for the handling device 10. This is followed more or less by only a switchover to the handling device whilst the basic display of the screen is retained (as a comparison of FIG. 2 on the one hand and 3 and 4 on the other hand shows).

A major advantage of this system according to the invention is that the specification of the safety conditions can also take place offline, i.e. not at the console 20 or its screen 22. Rather this is also possible for example on the premises of the tool constructor who manufactures the injection moulds. A personal computer customary in the trade on which the software for the specification of the safety conditions is implemented is sufficient for this. The personal computer (PC) consists of the usual computer unit 26, a keyboard 27 and also a screen 28 and optionally a mouse 29.

The safety conditions can be specified here at least for part of the movement sequences which relate for example to the mould halves, and then stored in a schematically represented intermediate memory 30. At a later point in time, these safety conditions can then be transferred from the device 26 into the console 20. There are different possibilities for this, for example it is possible to carry out the transfer via a schematically represented network 31, for example a bus system or a larger similar network such as the Internet, the computers 26 and 20 each being able to have a modem 32. Another transfer possibility is that the safety condition package created offline is transferred onto a transportable data carrier, for example a CD, which can then be read in via a reading apparatus or a drive 34 at the console 20.

Finally it is also conceivable to carry out the integration on or in the form of a microchip in which the safety conditions are implemented on the premises of the mould manufacturer. These safety conditions can then be read out, preferably in contactless manner, from the unit 36 with the antenna 37. The idea is that each mould in practice contains its own safety conditions and automatically transfers these to the console 20.

Overall the program section provided for the creation of the safety conditions can essentially cover the following functions:

Display and creation of safety conditions, preferably in graphically resolved form.

Brief suspension of the safety conditions for commissioning.

Management of different safety conditions created earlier.

Management of the error messages.

Management of the operating/blocking and gripper spaces of handling devices.

Allocation of operating spaces to components and thus to parts or machine data.

Management of the names for individual spaces.

Positioning of operating spaces of added components in the space.

Display of the operating spaces (preferably three-dimension).

Animation of the gripper spaces.

With the process according to the invention or the apparatus according to the invention it is possible to specify the safety conditions flexibly and yet reliably. Above all through the possibility of the offline creation of the safety conditions the possibility arises of relieving the user of the injection-moulding machine of the burden of complicated safety conditions by having these specified by the manufacturer of the tool (the injection-moulding machine mould).

What is claimed is:

1. Process for control of an injection-moulding machine in a form for guiding the operator, the process comprising: inputting a plurality of operating parameters required for an injection cycle to run, via an input unit into a data processing unit for storing these operating parameters and then one or more injection cycles are carried out according to the stored operating parameters, specifying a plurality of safety conditions for the protection of machine parts of the injection-moulding machine by means of which certain movement sequences of the injection-moulding machine are forbidden or allowed, prior to the start of an injection cycle, providing a screen with an input mask on which one at a time of several, graphically displayed, basic movement modules is selected in each case and on which then, for every selected basic movement module, a safety condition in the form of logical is adjusted or adopted from the state of one or more different basic movement modules and finally each adjusted or adapted safety condition is stored in the data processing unit.

2. Process according to claim 1, wherein the safety conditions are specified by the operator after components of the injection-moulding machine or a handling device required for a respective production sequence of the injection-moulding machine, and thus the possible basic movement modules, have been selected by the operator.

3. Process according to claim 1, wherein the safety conditions are specified by the operator before an actual graphically supported programming of the injection cycle begins on the screen, un-permitted program steps which infringe safety conditions not being offered to the operator, not being allowed in a selection or being identified as un-permitted program steps.

4. Process according to claim 1, wherein the safety conditions are created at least partly on the screen forming part of a console of the injection-moulding machine or a handling device of the injection-moulding machine, or a screen that is connected online with the injection-moulding machine via a network, and stored directly in a memory of the console.

5. Process according to claim 1, wherein the safety conditions are created at least partly on a screen of a computer separate from a console of the injection-moulding machine or handling device of the injection-moulding machine, initially stored on an intermediate memory and transferred later by the operator into a memory of the console.

6. Process according to claim 5, wherein a transportable non-volatile data carrier allocated to a specific injection mould of the injection-moulding machine is used as intermediate memory.

7. Process according to claim 1, wherein for each basic movement module a restrictively formulated default safety conditions is first displayed on the screen and the actual specification of the respective safety condition is carried out by adoption or modification of this default safety condition.

8. Apparatus for the control of an injection-moulding machine comprising a reading apparatus for a data carrier authorized to modify at least part of safety conditions and/or by an input apparatus for inputting a code authorizing the modification of at least part of the safety conditions, the safety conditions being for the protection of machine parts by means of which certain movement sequences of the injection-moulding machine are forbidden or allowed, the apparatus including a screen with an input mask on which one at a time of a plurality of basic movement modules are graphically displayed and means for adjusting or adopting every selected basic movement module using logical operations and while staying within the safety conditions.

9. Apparatus for the control of an injection-moulding machine comprising a reading apparatus for a transportable data carrier programmed with safety conditions allocated to a specific injection mould, the safety conditions being for the protection of machine parts by means of which certain movement sequences of the injection-moulding machine are forbidden or allowed, the apparatus including a screen with an input mask on which one at a time of a plurality of basic movement modules are graphically displayed and means for adjusting or adopting every selected basic movement module using logical operations and while staying within the safety conditions.

10. Apparatus according to claim 9, wherein the transportable data carrier is an optical, magnetic or non-volatile electronic data carrier.

11. Apparatus according to claim 9, wherein the data carrier is a microchip attached to or in the injection mould, the reading apparatus being for the reading out of the safety conditions stored on the microchip.

12. Apparatus for the control of an injection-moulding machine comprising an interface and/or a communication module including a modem for the adoption of safety conditions created offline and stored on an external intermediate memory to a memory of a console of the injection-moulding machine, the safety conditions being for the protection of machine parts by means of which certain movement sequences of the injection-moulding machine are forbidden or allowed, the apparatus including a screen with an input mask on which one at a time of a plurality of basic movement modules are graphically displayed and means for adjusting or adopting every selected basic movement module using logical operations and while staying within the safety conditions.

* * * * *